United States Patent
Parkman

(10) Patent No.: US 7,085,563 B2
(45) Date of Patent: Aug. 1, 2006

(54) FAIL-OVER OF FORWARD LINK EQUIPMENT

(75) Inventor: David S. Parkman, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 257 days.

(21) Appl. No.: 10/771,205

(22) Filed: Feb. 2, 2004

(65) Prior Publication Data

US 2004/0157598 A1 Aug. 12, 2004

Related U.S. Application Data

(62) Division of application No. 09/847,681, filed on May 2, 2001, now Pat. No. 6,728,535.

(51) Int. Cl.
*H04Q 7/20* (2006.01)

(52) U.S. Cl. .................. 455/431; 455/427; 455/428; 455/423

(58) Field of Classification Search .............. 455/427, 455/430, 428, 431, 422.1, 423, 418
See application file for complete search history.

(56) References Cited

U.S. PATENT DOCUMENTS

| | | | |
|---|---|---|---|
| 6,148,179 A | 11/2000 | Wright et al. | |
| 6,160,998 A | 12/2000 | Wright et al. | |
| 6,163,681 A | 12/2000 | Wright et al. | |
| 6,167,239 A | 12/2000 | Wright et al. | |
| 6,173,159 B1 | 1/2001 | Wright et al. | |
| 6,243,373 B1 | 6/2001 | Turock | |
| 6,295,292 B1 | 9/2001 | Voit et al. | |
| 6,353,734 B1 | 3/2002 | Wright et al. | |
| 6,396,849 B1 | 5/2002 | Sarkissian et al. | |
| 6,445,682 B1 | 9/2002 | Weitz | |
| 6,466,571 B1 | 10/2002 | Dynarski et al. | |
| 6,728,535 B1 * | 4/2004 | Parkman | 455/430 |
| 2002/0021689 A1 | 2/2002 | Robbins et al. | |
| 2002/0164981 A1 * | 11/2002 | Parkman | 455/431 |
| 2004/0157598 A1 * | 8/2004 | Parkman | 455/427 |

* cited by examiner

*Primary Examiner*—Joseph Feild
*Assistant Examiner*—Huy D. Nguyen
(74) *Attorney, Agent, or Firm*—Harness Dickey & Pierce P.L.C.

(57) ABSTRACT

A communications system and method for transmitting data to a mobile platform is provided. The communications system comprises a forward link assignment manager in communication with a route server and a router, wherein the router selects from paths of forward link equipment chains to transmit data to the mobile platform. Generally, the forward link assignment manager assigns a cost to the path of each chain such that the more available the chain, the lower its cost, and the router always selects the lowest cost path. If a chain of forward link equipment fails, the forward link assignment manager increases its cost above that of a spare chain, which results in the router selecting the spare chain. Further systems are provided that inform the forward link assignment manager of a failed chain of forward link equipment, in addition to systems that remove a failed chain from the network topology.

15 Claims, 2 Drawing Sheets

FAIL-OVER OF FORWARD LINK EQUIPMENT

CROSS REFERENCE TO RELATED APPLICATIONS

This application is a divisional of U.S. Pat. application Ser. No. 09/847,681 filed on May 2, 2001, now U.S. Pat. No. 6,728,535. The disclosure of the above application is incorporated herein by reference.

FIELD OF THE INVENTION

The present invention relates generally to bi-directional satellite communication systems and more particularly to systems and methods for selecting chains of forward link equipment that transmit signals to a mobile platform.

BACKGROUND OF THE INVENTION

In bi-directional communications systems of the related art, a ground station transmits and receives signals to and from a satellite, and the satellite, in turn, transmits and receives signals to and from a mobile platform. Typically, a plurality of satellites are present that cover particular geographic regions, and each satellite further includes a plurality of transponders that receive data from the ground station and subsequently transmit data to the mobile platform. In addition, the mobile platform includes receive and transmit antennas, which are used to communicate with the satellite transponders.

A ground station typically includes equipment that transmits signals to the satellite transponders. Further, some ground stations include additional back-up equipment in the event of an original equipment failure. When the original equipment fails, the equipment can be manually repaired or replaced, or a switch can be made to the back-up equipment. Generally the switch is made when monitoring equipment recognizes a failure of the original equipment and directly switches to the back-up equipment. In many instances of equipment failure, signal transmission is interrupted for an extended period of time, which can severely threaten operation of the mobile platform, depending on the type of data being transmitted.

Accordingly, there remains a need in the art for a communications system that can quickly and efficiently switch between transmission equipment with minimal disruption in service to the mobile platform.

SUMMARY OF THE INVENTION

In one preferred form, the present invention provides a communications system and method that comprises a ground station having a route server in communication with a router, which further communicates with primary chains of forward link equipment. The term "forward link" is used to denote transmissions from the ground station to a mobile platform, and the term "return link" is used to denote transmissions from the mobile platform to the ground station.

The primary chains of forward link equipment transmit signals to satellite transponders, which in turn transmit the signals to mobile platforms, e.g. aircraft. The signals generally comprise data that is requested by the mobile platform including, but not limited to, command and control, telemetry, unicast (Internet), and multicast (video, audio). In addition to the primary chains of forward link equipment, the present invention further comprises spare chains of forward link equipment that are employed when the primary chains of forward link equipment fail.

Generally, a forward link assignment manager is aware of all available equipment and assigns equipment to forward links. In addition, the route server contains all paths to all chains of forward link equipment, and the forward link assignment manager assigns a cost to each path according to the availability of the path. The lower the cost of the path, the more available the path. The route server then presents the paths, along with their costs, to the router, which always selects the lowest cost path for subsequent transmission of the signals to the transponders. If a primary chain of forward link equipment that has been selected by the router fails, the forward link assignment manager reassigns the forward link equipment and increases the path cost of the failed equipment to a level higher than that of the spare equipment paths such that the router will choose the path of a spare chain of forward link equipment. Once the router has selected a path for a spare chain of forward link equipment, the route server stops providing the path of the failed primary chain of forward link equipment to the router and the forward link assignment manager removes the failed path from the network topology.

Additionally, if the spare chain of forward link equipment also fails, the router will similarly select a path for an alternate spare chain of forward link equipment in accordance with the method as previously described. The router will further select paths for alternate spare chains of forward link equipment as the spare chains fail, until no spare chains of forward link equipment remain.

Preferably, the forward link assignment manager is informed of the failed chain of forward link equipment by the mobile platform. Accordingly, each path of both the primary and spare chains of forward link equipment are assigned a unique multicast signature message address, hereinafter referred to as a "unique address." The unique address is transmitted to the mobile platform along with the data signals, via the transponders, such that the mobile platform is continuously aware of the path being used. The mobile platform, in turn, transmits the unique address to the forward link assignment manager, thereby informing the forward link assignment manager which chain is currently transmitting data. When a chain of forward link equipment fails, the unique address is no longer transmitted to the forward link assignment manager such that the forward link assignment manager recognizes that the chain has failed. The forward link assignment manager then increases the cost of the failed chain to a level higher than that of the spare chains, and the router accordingly selects a spare chain of forward link equipment.

When the spare chain of forward link equipment is operational, the mobile platform receives a different unique address, and accordingly transmits the unique address to the forward link assignment manager. As a result, the forward link assignment manager is made aware of the spare chain of forward link equipment being operational and thus removes the failed chain of forward link equipment from the network topology.

In another preferred form, the primary and spare chains of forward link equipment further comprise a built in test system that is capable of determining whether a failure has occurred. If a failure of a chain of forward link equipment occurs, the built in test system transmits signals to the forward link assignment manager informing the forward link assignment manager of the failure. The forward link assignment manager then increases the cost of the failed chain of forward link equipment so that the router will choose a lower cost chain of forward link equipment. Once the lower cost chain of forward link equipment is operational, the forward link assignment manager removes the failed chain of forward link equipment from the network topology.

In another preferred form, the present invention further comprises a monitoring system that monitors the forward link signal traffic from the chains of forward link equipment to the transponders. If a failure of a chain of forward link equipment occurs, the monitoring system informs the forward link assignment manager of the failure. Similarly, the forward link assignment manager then increases the cost of the failed chain of forward link equipment so that the router will choose a lower cost chain of forward link equipment. Again, once the lower cost chain of forward link equipment is operational, the forward link assignment manager removes the failed chain of forward link equipment from the network topology.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The following description of the preferred embodiments is merely exemplary in nature and is in no way intended to limit the invention, its application, or uses.

Figure 1:
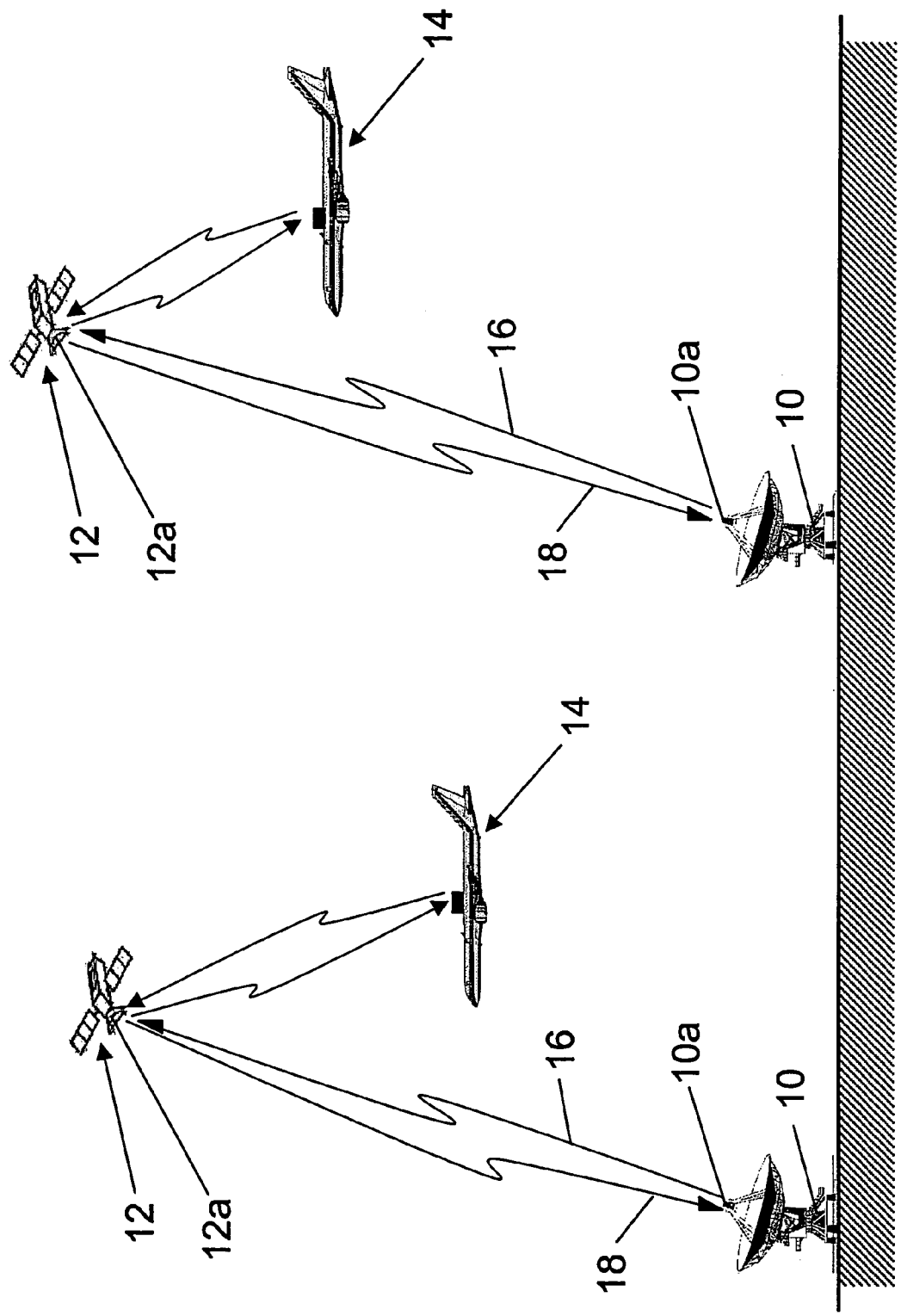
FIG. 1 is a simplified diagram illustrating the bidirectional communication environment of the present invention.

The preferred embodiment of the communications system of the present invention operates in an environment as illustrated in FIG. 1. The environment generally comprises a ground station 10 in communication with a satellite 12, which in turn is in communication with a mobile platform 14. As shown, there may exist a plurality of ground stations 10, satellites 12, and mobile platforms 14 around the world for continuous data communications regardless of geographic location. In operation, data is transmitted from the ground station 10 to the mobile platform 14 through a forward link 16, and data, in turn, is transmitted from the mobile platform 14 to the ground station 10 through a return link 18. The term "return link" as used herein refers to any transmission from the mobile platform 14 for ultimate reception by the ground station 10. Additionally, the ground station 10 generally manages and controls all data, which is transmitted to mobile platforms 14 via transponders 12a located on satellites 12.

Although the present invention is directed to a communications system wherein the mobile platform is an aircraft, the invention is also applicable to other mobile platforms such as ships, trains, buses, and others. Accordingly, the reference to aircraft throughout the description of the invention herein should not be construed as limiting the applicability of the invention to only aircraft.

Figure 2:
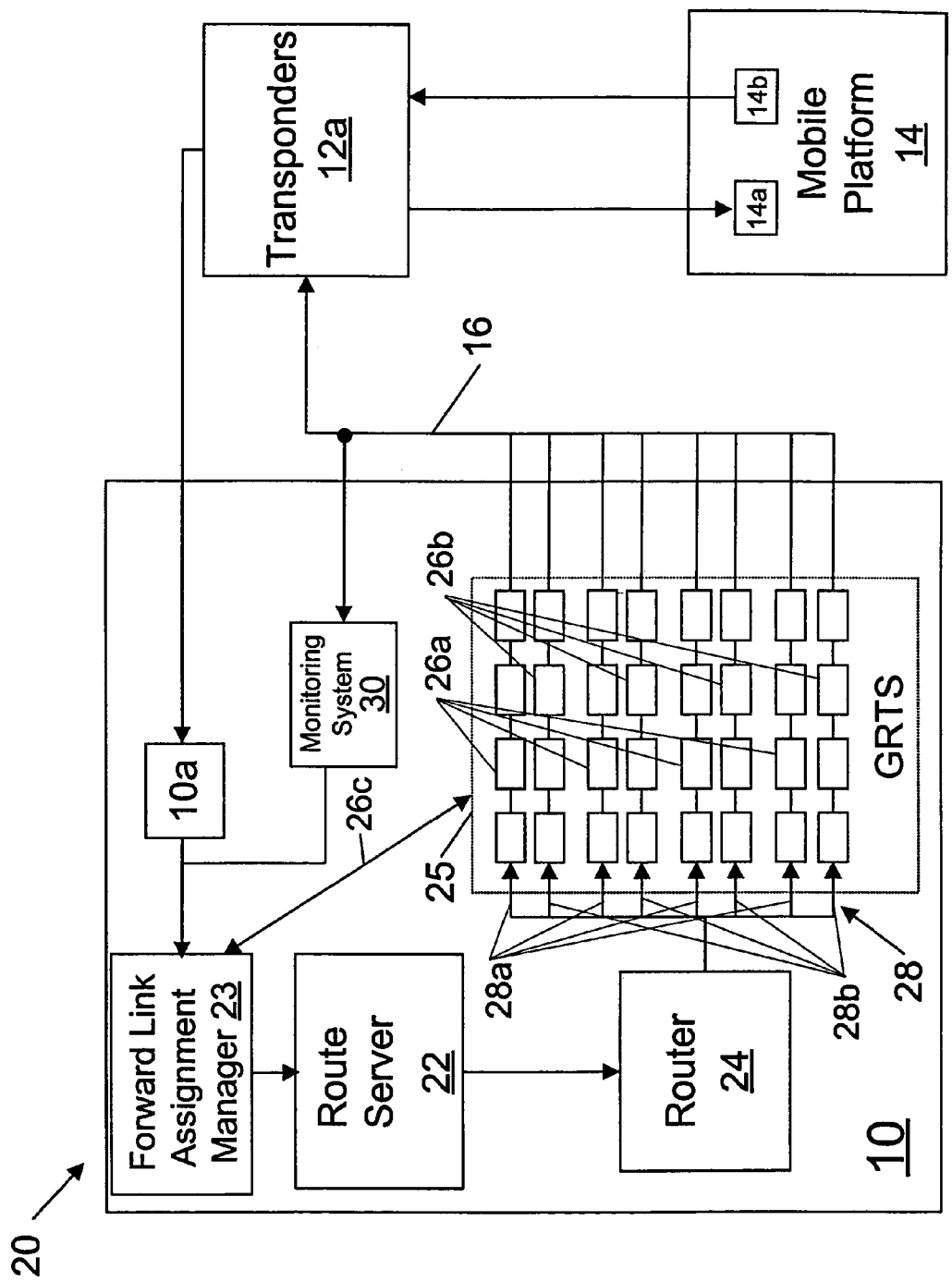
FIG. 2 is a block diagram illustrating the communication between the forward link assignment manager, the route server, the router, the transponders, and the mobile platform of the present invention.

Referring to FIG. 2, the preferred embodiment of the communications system of the present invention is illustrated and generally indicated by reference numeral 20. As shown, communications system 20 is located within ground station 10 and comprises a forward link assignment manager 23 in communication with a route server 22, a router 24, and a ground receiver transmitter system (GTRS) 25, wherein the router 24 routes data to the chains of forward link equipment 26 within the GRTS 25. The chains of forward link equipment 26 then transmit signals to the mobile platform 14 via transponders 12a.

The chains of forward link equipment 26 comprise a plurality of primary chains of forward link equipment 26a and a plurality of spare chains of forward link equipment 26b. In the event of a failure of any primary chain of forward link equipment 26a, the forward link assignment manager 23 will reconfigure a spare chain of forward link equipment 26b, and the router 24 will subsequently transmit signals to the spare chain of forward equipment 26b. Similarly, if any spare chain of forward link equipment 26b fails, the forward link assignment manager 23 will reconfigure another spare chain, and the router 24 will transmit signals to another spare chain of forward link equipment 26b until no spare chain of forward link equipment 26b remains.

The router 24 transmits signals to the chains of forward link equipment 26 through the paths 28. Each chain of forward link equipment has a unique path, e.g. 28a, 28b, and so on, and each path further has a unique address. The router 24 obtains the available paths 28 from the route server 22, and the forward link assignment manager 23 generally manages and controls the paths that are used to transmit data to the mobile platform 14. Route server 22 further maintains a list of all chains of forward link equipment 26 and the status of each chain. If a chain of forward link equipment fails, the forward link assignment manager 23 removes the chain from the network topology as described in greater detail below.

Internally, forward link assignment manager 23 provides the logic for how a particular path is selected by router 24. Accordingly, the forward link assignment manager 23 assigns a cost to each path 28 of the chains of forward link equipment 26 in order to provide a priority listing of paths for the route server 22. The higher the cost of the chain, the lower the availability, and further, the router 24 always selects the chain of forward link equipment 26 with the lowest cost. When a chain of forward link equipment 26 fails during operation, the forward link assignment manager 23 increases the cost of the failed chain of forward link equipment to a level higher than that of a spare chain of forward link equipment 26b so that the router 24 will select the spare chain of forward link equipment 26b. After the router 24 has selected the spare chain of forward link equipment 26b and the chain is in operation, forward link assignment manager 23 removes the failed chain of forward link equipment from the network topology.

The forward link assignment manager 23 is informed of a failed chain of forward link equipment 26 and the operation of a spare chain of forward link equipment 26b using the unique addresses of each path through mobile platform 14. As such, the unique address of the chain of forward link equipment 26 is transmitted to the receivers 14a of mobile platform 14 along with the other data being transmitted via transponders 12a. Accordingly, the mobile platform 14 is constantly aware of which chain of forward link equipment 26 is providing its data. Transmitter 14b of mobile platform 14 then transmits signals to the receiver 10a of ground station 10 via transponders 12a, informing the forward link assignment manager 23 of the unique address of the path currently transmitting data. If a chain of forward link equipment 26 fails, the mobile platform 14 will no longer receive the unique address belonging to the failed chain of forward link equipment 26, and as such the forward link assignment manager 23 knows that the chain of forward link equipment 26 has failed.

The forward link assignment manager 23 will then increase the cost of the failed chain of forward link equipment 26 to a level higher than that of a spare chain of forward link equipment 26b so that the router 24 will select the path of a spare chain of forward link equipment 26b. After the router 24 selects the spare chain of forward link equipment 26b, the mobile platform 14 will receive the new unique address belonging to the spare chain, and accordingly, will transmit the new unique address to the forward link assignment manager 23 via transponders 12a and receiver 10a. After the forward link assignment manager 23 has been made aware of the new unique address, forward link assignment manager 23 removes the failed chain of forward link equipment 26 from the network topology.

Another preferred form of the present invention employs a built in test system in each chain of forward link equipment 26 to inform the forward link assignment manager 23 of a failure in the chain. If a chain of forward link equipment 26 fails, its built in test (BIT) system informs the forward link assignment manager 23 of the failure through BIT link 26c. The forward link assignment manager 23 then increases the cost of the failed chain of forward link equipment 26 to a level higher than that of a spare chain of forward link equipment 26b so that the router 24 will select the path of the spare chain of forward link equipment 26b. After the spare chain of forward link equipment is in operation, and the forward link assignment manager 23 is made aware of the switch through reception of a new unique address from mobile platform 14, the forward link assignment manager 23 removes the failed chain of forward link equipment 26 from the network topology.

Yet another preferred form of the present invention employs a monitoring system 30 to inform forward link assignment manager 23 of a failure in a chain of forward link equipment 26. As shown, monitoring system 30 monitors the flow of data through forward link 16. If a chain of forward link equipment 26 fails, monitoring system 30 will not experience any data flow, and accordingly, will inform forward link assignment manager 23 of the failure. Similarly, forward link assignment manager 23 will then increase the cost of the failed chain of forward link equipment 26 to a level higher than that of a spare chain of forward link equipment 26b so that the router 24 will select the path of the spare chain of forward link equipment 26b. After the spare chain of forward link equipment is in operation, and the forward link assignment manager 23 is made aware of the switch through reception of a new unique address from mobile platform 14, the forward link assignment manager 23 removes the failed chain of forward link equipment 26 from the network topology.

In operation, the route server 22 presents the available paths 28, along with their attendant costs, to the router 24. When all chains of forward link equipment 26 are operational, the primary chains of forward link equipment 26a have a lower cost than the spare chains of forward link equipment 26b. The router 24 then selects the path of the lowest cost chain of forward link equipment 26, which is a primary chain of forward link equipment 26a when all chains are operational. When the primary chain of forward link equipment 26a fails, either the mobile platform 14, the built in test system of forward link equipment 26, or the monitoring system 30, as previously described, informs the forward link assignment manager 23 of the failure. The forward link assignment manager 23 then increases the cost of the failed primary chain of forward link equipment 26a above the cost of a spare chain of forward link equipment 26b such that the router 24 selects the path of the spare chain of forward link equipment 26b.

Once the mobile platform 14 receives the unique address of the spare chain of forward link equipment 26b, the unique address is transmitted to the forward link assignment manager 23 via transponders 12a. The route server 22 then removes the failed chain of forward link equipment 26 from the network topology. If the spare chain of forward link equipment 26b fails, the communications system 20 of the present invention will similarly employ another spare chain of forward link equipment and remove the failed chain from the network topology according to the method as previously described.

Additionally, the communications system 20 of the present invention may employ a plurality of forward link assignment managers 23, route servers 22, routers 24, chains of forward link equipment 26, and monitoring systems 30. Further, the present invention may provide a plurality of transponders 12a on a plurality of satellites 12, in addition to a plurality of mobile platforms 14.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A system for transmitting signals from a first communications station to a second communications station, comprising:

at least one electronic device that transmits the signals to the second communications station;

a plurality of primary chains of forward link equipment that transmit the signals to the electronic device, wherein each primary chain of said forward link equipment further comprises a path;

a plurality of spare chains of forward link equipment, wherein each spare chain of forward link equipment further comprises a path;

at least one router that sends the signals to the primary chains of forward link equipment via the paths of the primary chains of forward link equipment;

at least one forward link assignment manager that manages the paths of primary chains of forward link equipment and the paths of the spare chains of forward link equipment and provides each of the paths of the spare chains of forward link equipment with a priority designator; and wherein if one of said primary chains of forward link equipment fails, said router sends the signals to one of said paths of spare chains of forward link equipment based on said priority designator.

2. The system of claim 1, wherein said priority designator represents a cost.

3. The system of claim 1, wherein each of said paths of primary chains of forward link equipment is assigned a priority designator by the forward link assignment manager.

4. The system of claim 3, wherein when one of said paths of primary chains of forward link fails, said forward link assignment manager increases the priority of the path of the failed primary chain of forward link equipment beyond the priority assigned to the paths of the spare chains of forward link equipment.

5. The system of claim 3, wherein the priority assigned to each of the paths of spare chains of forward link equipment and primary chains of forward link equipment comprises a cost.

6. The system of claim 1, further comprising at least one route server that provides the paths of the primary chains of forward link equipment and the paths of the spare chains of forward link equipment to the router.

7. A system for transmitting signals from a first communications station to a second communications station, comprising:

at least one transponder that transponds the signals from the first communications station to the second communications station;

a plurality of primary chains of forward link equipment that transmit the signals to the transponder, wherein each primary chain of said forward link equipment further comprises a path;

a plurality of spare chains of forward link equipment, wherein each said spare chain of forward link equipment further comprises a path;

at least one router that sends the signals to the primary chains of forward link equipment via the paths of the primary chains of forward link equipment;

at least one forward link assignment manager that manages the paths of the primary chains of forward link equipment and the paths of the spare chains of forward link equipment and provides each of the paths of the spare chains of forward link equipment and the primary chains of forward link equipment with a designator; and wherein if one of said primary chains of forward link equipment fails, said router sends the signals to one of said paths of spare chains of forward link equipment based on said designator.

8. The system of claim 7, wherein the designator assigned to each of the paths of spare chains of forward link equipment and the paths of primary chains of forward link equipment comprises a cost value.

9. The system of claim 7, wherein when a primary chain of forward link equipment fails, the forward link assignment manager alters the designator of the path of the failed primary chain of forward link equipment.

10. The system of claim 7, wherein when one said primary chain of forward link equipment fails, the forward link assignment manager alters the cost value assigned to the path of the failed primary chain of forward link equipment.

11. The system of claim 7, wherein when one said primary chain of forward link equipment fails, the forward link assignment manager increases the cost value of the path of said failed primary chain of forward link equipment to a cost value that is higher than those cost values assigned to each of the paths of secondary chains of forward link equipment.

12. A method of transmitting signals from a first communications station to a second communications station via at least one electronic device, the method comprising:

(a) managing paths for a plurality of primary chains of forward link equipment and a plurality of spare chains of forward link equipment in a forward link assignment manager;

(b) providing the paths for the primary chains of forward link equipment and the paths for the spare chains of forward link equipment to at least one router;

(c) selecting a path for a chain of primary forward link equipment by the router;

(d) transmitting the signals from the router to the primary chain of forward link equipment having the selected path of step (d);

(e) transmitting the signals from the chain of primary forward link equipment to the electronic device; and (f) transmitting the signals from the electronic device to the mobile platform;

(g) wherein if the chain of primary forward link equipment from step (e) fails, the router selects a path for a spare chain of forward link equipment that transmits the signals to the electronic device.

13. The method of claim 12, further comprising the step of assigning a cost value to paths of the primary chains of forward link equipment and to the paths of the spare chains of forward link equipment.

14. The method of claim 13, further comprising increasing the cost value of the path of the chain of failed forward link equipment higher than the cost of the paths of the spare chains of forward link equipment.

15. The method of claim 14, further comprising selecting one of the paths of spare chains of forward link equipment based on which of the spare chains of forward link equipment has the lowest cost value.

* * * * *